United States Patent
Ortolan et al.

(10) Patent No.: US 10,829,918 B2
(45) Date of Patent: Nov. 10, 2020

(54) AIRCRAFT LAVATORY TOUCHLESS MANIFOLD SYSTEM

(71) Applicant: B/E Aerospace, Inc., Winston Salem, NC (US)

(72) Inventors: Christina Ortolan, Long Beach, CA (US); Yen Chuh, Irvine, CA (US); Thao Hoang, Arlington, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 99 days.

(21) Appl. No.: 16/264,590

(22) Filed: Jan. 31, 2019

(65) Prior Publication Data
US 2020/0248440 A1 Aug. 6, 2020

(51) Int. Cl.
*E03C 1/05* (2006.01)
*B64D 11/02* (2006.01)
*G05D 23/13* (2006.01)

(52) U.S. Cl.
CPC .............. *E03C 1/057* (2013.01); *B64D 11/02* (2013.01); *G05D 23/1393* (2013.01)

(58) Field of Classification Search
CPC ... E03C 1/057; E03C 1/0401; G05D 23/1393; B64D 11/02; B64D 11/04
USPC ........................................... 236/12.12; 4/619
See application file for complete search history.

(56) References Cited

U.S. PATENT DOCUMENTS

| 5,504,950 | A  | * | 4/1996  | Natalizia  | E03C 1/057 137/625.41 |
| 7,406,722 | B2 | * | 8/2008  | Fukuizumi  | A47K 5/1217 4/623 |
| 8,225,437 | B2 |   | 7/2012  | Kurita     | |
| 2009/0100593 | A1 | * | 4/2009 | Lincoln    | A47K 5/1202 4/623 |
| 2017/0320575 | A1 |   | 11/2017 | Oguri et al. | |
| 2018/0284818 | A1 | * | 10/2018 | Christenson | F16K 11/0716 |

FOREIGN PATENT DOCUMENTS

JP 5839761 B1 1/2016

* cited by examiner

*Primary Examiner* — Michael R Reid
(74) *Attorney, Agent, or Firm* — Suiter Swantz pc llo

(57) ABSTRACT

A system and related method for touchless control of an aircraft lavatory water supply is disclosed. An aircraft lavatory touchless manifold includes dual solenoid powered water valves opening and closing to regulate water flow through each of a cold conduit and a hot conduit as commanded by user touchless input to a manifold microcontroller commanding the valves. An aircraft input commands a temperature range while a thermal sensor in a mixed water conduit provides output temperature feedback to the manifold microcontroller for positive control of the output temperature. The manifold microcontroller commands opening and closing of the dual solenoid powered valves to create a ratio of opening time between the valves. The solenoid powered valves provide a cost effective and reliable solution offering efficient linear valve operation and effective temperature and flow control.

20 Claims, 12 Drawing Sheets

AIRCRAFT LAVATORY TOUCHLESS MANIFOLD SYSTEM

BACKGROUND

Traditional aircraft lavatory water systems may provide hot and cold water to a faucet for user consumption. Some models may intake only cold water and require an electrical heating element to heat the water to a desired temperature. Many systems may require a costly local heating element requiring a high voltage and may be prone to failure over time.

Therefore, a need remains for a system and related method for a touchless manifold system configured to operate when installed on a plurality of aircraft types and models. The touchless manifold system may be particularly configured for continued operation combining efficient control methods with durable solenoid operated valves.

SUMMARY

In one aspect, embodiments of the inventive concepts disclosed herein are directed to a system for aircraft lavatory touchless water control. The system may comprise a touchless manifold system having a cold conduit, a hot conduit, a mixing chamber, and a mixed conduit. The touchless manifold system may include a cold inlet coupled with the cold conduit and configured to couple with an aircraft cold water supply and a hot inlet coupled with the hot conduit and configured to couple with an aircraft hot water supply. For communication, the touchless manifold system may include an aircraft data connection as well as a faucet data connection. Here, a manifold microcontroller may operatively couple with the aircraft data connection and the faucet data connection.

Also, a cold thermal sensor may be proximal with the cold inlet and configured to measure a temperature of a cold fluid within the cold conduit, the cold thermal sensor operatively coupled with the manifold microcontroller. A hot thermal sensor may be proximal with the hot inlet and configured to measure a temperature of a hot fluid within the hot conduit, the hot thermal sensor operatively coupled with the manifold microcontroller.

For operation, a cold solenoid may be operatively coupled with the manifold microcontroller and a cold solenoid valve, the cold solenoid valve configured to control a flow of the cold fluid within the cold conduit and a hot solenoid may be operatively coupled with the manifold microcontroller and a hot solenoid valve, the hot solenoid valve configured to control a flow of the hot fluid within the hot conduit.

For combining the dual flows, the mixing chamber may be proximal with each of the cold solenoid valve, the hot solenoid valve, and the mixed conduit, the mixing chamber configured to receive an output from each of the cold and hot solenoid valves and deliver a mixed flow to the mixed conduit. Here the microcontroller may be configured for receiving a temperature command via the aircraft data connection, receiving a cold temperature reading from the cold thermal sensor and a hot temperature reading from the hot thermal sensor, and receiving a faucet data signal via the faucet data connection. The faucet data signal may include a mixed temperature reading from a mixed thermal sensor, a faucet valve signal from a faucet valve sensor, a cold selection signal from a faucet cold selection sensor, and a hot selection signal from a faucet hot selection sensor.

The microcontroller may mix the cold flow with the hot flow via a timing command of the cold solenoid and the hot solenoid based on 1) the temperature command, 2) the cold and hot temperature reading, and 3) the faucet data signal.

In a further aspect a method for aircraft lavatory touchless water control may comprise receiving a temperature command via an aircraft data connection, receiving a cold temperature reading from a cold thermal sensor within a cold conduit and a hot temperature reading from a hot thermal sensor within a hot conduit. In addition, the method may comprise receiving a faucet data signal via a faucet data connection. Here the faucet data signal may include a mixed temperature reading from a mixed thermal sensor, a faucet valve signal from a faucet valve sensor, a cold selection signal from a faucet cold selection sensor, and a hot selection signal from a faucet hot selection sensor.

The method may command a cold solenoid and a hot solenoid based on 1) the temperature command, 2) the cold and hot temperature reading, and 3) the faucet data signal. Wherein the cold solenoid is operatively coupled with a cold solenoid valve, the cold solenoid valve configured to control a flow of a cold fluid within the cold conduit, the hot solenoid is operatively coupled with a hot solenoid valve, the hot solenoid valve configured to control a flow of a hot fluid within the hot conduit, each of the cold and hot solenoid valves is proximal with a mixing chamber configured to receive an output from each of the cold and hot solenoid valves and deliver a mixed flow to a mixed conduit.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function in the drawings in which.

DETAILED DESCRIPTION OF EXEMPLARY EMBODIMENTS

Figure 1:
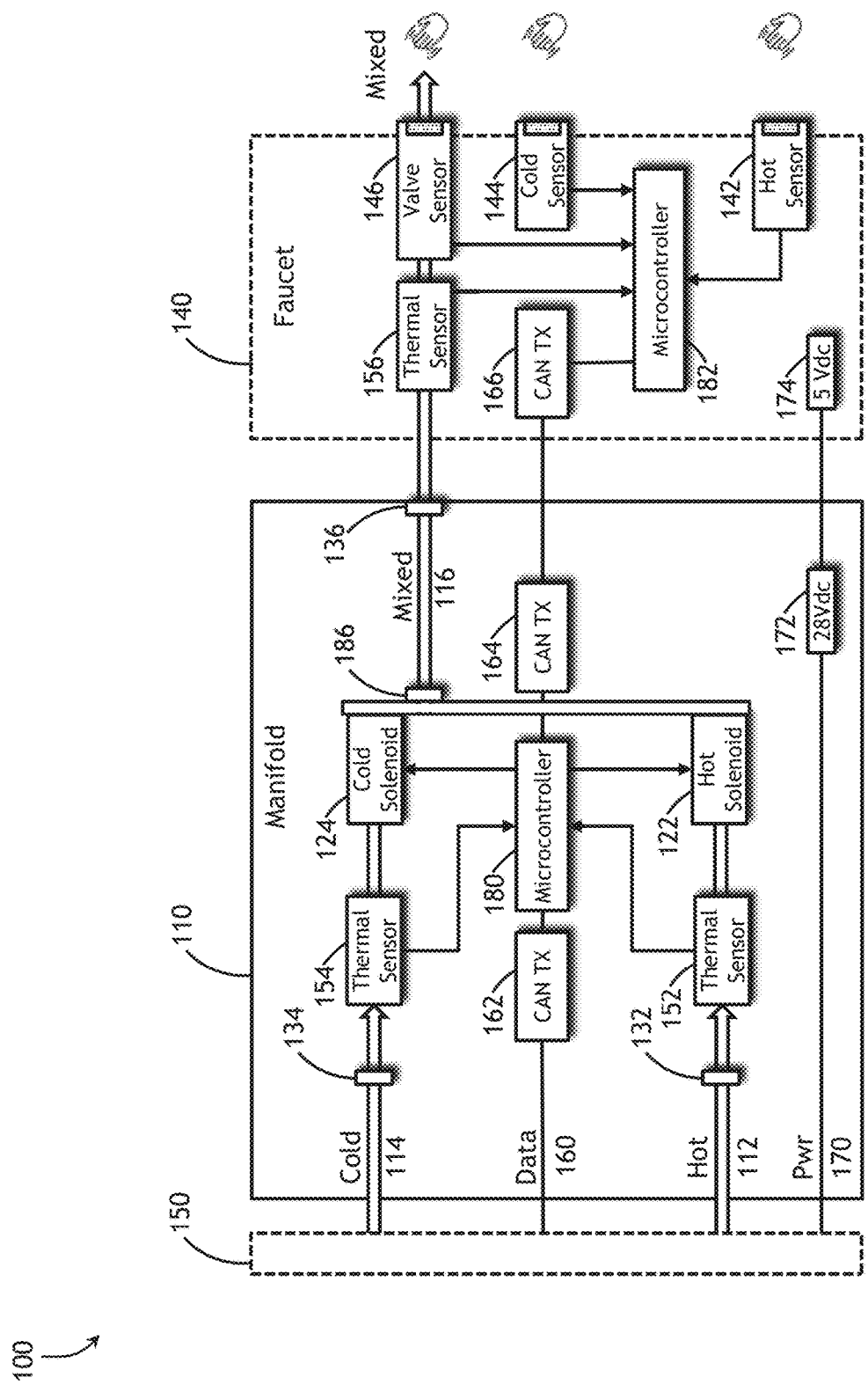
FIG. 1 is a diagram of a touchless manifold system overview in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

OVERVIEW

Broadly, embodiments of the inventive concepts disclosed herein are directed to a system and related method for touchless control of an aircraft lavatory water supply is disclosed. An aircraft lavatory touchless manifold includes dual solenoid powered water valves opening and closing to regulate water flow through each of a cold conduit and a hot conduit as commanded by user touchless input to a manifold microcontroller commanding the valves. An aircraft input commands a temperature range while a thermal sensor in a mixed water conduit provides output temperature feedback to the manifold microcontroller for positive control of the output temperature. The manifold microcontroller commands opening and closing of the dual solenoid powered valves to create a ratio of opening time between the valves. The solenoid powered valves provide a cost effective and reliable solution offering efficient linear valve operation and effective temperature and flow control.

| Reference | Chart |
|---|---|
| 140 | Faucet |
| 100 | Overview Diagram |
| 110 | Touchless Manifold System |
| 112 | Hot Water Conduit |
| 114 | Cold Water Conduit |
| 116 | Mixed Water Conduit |
| 122 | Hot Solenoid |
| 124 | Cold Solenoid |
| 132 | Hot Inlet |
| 134 | Cold Inlet |
| 136 | Mixed Outlet |
| 142 | Hot Selection Sensor |
| 144 | Cold Selection Sensor |
| 146 | Faucet Valve Sensor |
| 150 | Aircraft Interface |
| 152 | Hot Thermal Sensor |
| 154 | Cold Thermal Sensor |
| 156 | Mixed Thermal Sensor |
| 160 | Aircraft Data |
| 162 | Aircraft Data Connection |
| 164 | Faucet Data Connection |
| 166 | Manifold Data Connection |
| 170 | Aircraft Power |
| 172 | 28 Vdc |
| 174 | 5 Vdc |
| 180 | Manifold Microcontroller |
| 182 | Faucet Microcontroller |
| 186 | Mixing Chamber |
| 200 | Orthogonal View Manifold |
| 210 | Manifold Body |
| 300 | Front View Manifold |
| 322 | Hot Solenoid Valve |
| 324 | Cold Solenoid Valve |
| 332 | Hot Poppet |
| 334 | Cold Poppet |
| 400 | Transparent View Manifold |
| 500 | Cut Away View Manifold |
| 600 | Cut Away View Expanded |
| 700 | Top Bottom Side Views |
| 800 | Touchless Manifold Body |

-continued

| Reference | Chart |
|---|---|
| 900 | Manifold Body Expanded |
| 1000 | Manifold Body Cutaway |
| 1100 | Method Flowchart |

FIG. 1

Referring to FIG. 1, a diagram of a touchless manifold system overview in accordance with an embodiment of the inventive concepts disclosed herein is shown. An overview diagram 100 of an aircraft lavatory touchless manifold system may indicate some elements of the system structure. A touchless manifold system 110 may include a manifold microcontroller 180 in control of the touchless manifold system 110. The touchless manifold system 110 may include a cold conduit 114, a hot conduit 112, a mixing chamber 186, and a mixed conduit 116. The touchless manifold system 110 may further include a cold inlet 134 coupled with the cold conduit 114 and configured to couple with an aircraft cold water supply. Also, a hot inlet 132 coupled with the hot conduit 112 may be configured to couple with an aircraft hot water supply.

In one embodiment of the inventive concepts disclosed herein, to communicate with the host aircraft via an aircraft interface 150, and a touchless faucet 140, and receive commands therefrom, the touchless manifold system 110 may include an aircraft data connection 162 and a faucet data connection 164. The manifold microcontroller 180 may operatively couple with the aircraft data connection 162 and the faucet data connection 164 to send and receive commands and readings as described herein.

In one embodiment of the inventive concepts disclosed herein, the aircraft data 160 signal may be via a Controller Area Network (CAN bus). The CAN bus may be a robust vehicle bus standard designed to allow devices to communicate with each other in applications without a host computer. A CAN transceiver (TX) may include a plurality of format of data transceivers. For example, a data bus capable of transmission and reception of a data signal may fall directly within the scope of an embodiment of the inventive concepts disclosed herein. Within the touchless faucet 140, a faucet microcontroller 182 may couple with the faucet data connection 164 via a manifold data connection 166.

To measure the temperature of each input water supply, the touchless manifold system 110 may employ a cold thermal sensor 154 which may be sited proximal with the cold inlet and configured to measure a temperature of a cold fluid within the cold conduit 114. The cold thermal sensor 154 may be operatively coupled with the manifold microcontroller 180. Similarly, a hot thermal sensor 152 may be sited proximal with the hot inlet and configured to measure a temperature of a hot fluid within the hot conduit 112. The hot thermal sensor 152 may be operatively coupled with the manifold microcontroller 180.

To control the cold flow within the cold conduit 114, the touchless manifold system 110 may employ a cold solenoid 124 operatively coupled with the microcontroller functional to operate a cold solenoid valve. Similarly, to control a flow of the hot fluid within the hot conduit 112, a hot solenoid 122 may be operatively coupled with the manifold microcontroller 180 to operate a hot solenoid valve.

In one embodiment of the inventive concepts disclosed herein, each of the cold fluid and the hot fluid may be potable water supplied from an aircraft water supply. The hot potable water may be heated to a sufficient temperature for use by each system onboard the aircraft. Depending on the temperature of the heated aircraft water supply, the touchless manifold system 110 may operate to by manipulating each of the hot solenoid valve and the cold solenoid valve to create a desired water temperature in the mixed conduit 116. Regardless of aircraft water supply temperature, the touchless manifold system 110 may operate to regulate the temperature of the water at the mixed conduit 116 to a user desired temperature.

In one embodiment, the touchless manifold system 110 may be configured to function supplied by a standard aircraft electrical power 170. In one embodiment, the touchless manifold system 110 may be configured to operate using an aircraft supplied power of 28 Vdc. This standard supply may power each of the touchless manifold system 110 at 28 Vdc 172 and the faucet 140 at 5 Vdc 174. In the manner, the touchless manifold system 110 may function across a plurality of aircraft platforms and be easily incorporated to many aircraft lavatory construction requirements.

Here, the manifold microcontroller 180 may be configured for receiving a temperature command via the aircraft data connection 162. Aircraft data 160 may include a temperature command received via the aircraft data connection including a maximum, a minimum, and range temperature at a faucet mixed thermal sensor 156. For example, the temperature command may include a maximum temperature of an exemplary 38 degrees Celsius and a minimum temperature of 10 degrees Celsius. A range of temperature may be defined as an exemplary range of 10 to 38 degrees C. as well as a plus or minus range surrounding each of the maximum and minimum temperatures.

In one embodiment of the inventive concepts disclosed herein, the aircraft temperature command may be supplied by a crewmember onboard the aircraft. In this manner, the crewmember may command a specific range of temperatures from which the touchless manifold system 110 may begin to operate. Once in operation, the user at the faucet 140 may manipulate the temperature to a desired temperature via the cold 144 and hot 142 sensors.

The manifold microcontroller 180 may also receive a cold temperature reading from the cold thermal sensor 154 and a hot temperature reading from the hot thermal sensor 152. These temperature readings may be directly from each of the respective cold 114 and hot 112 conduits measuring each temperature of the fluid flow as it is received from the aircraft supply.

The manifold microcontroller 180 may also receive a faucet data signal via the faucet data connection 164, the faucet data signal may include each input from the faucet 140. The faucet data signal may include a mixed temperature reading from the mixed thermal sensor 156, a faucet valve signal (on/off) from a faucet valve sensor 146, a cold selection signal from a faucet cold selection sensor 144, and a hot selection signal from a faucet hot selection sensor 142.

Based on each of these data inputs, the manifold microcontroller 180 may command a mix of the cold flow with the hot flow via a timing command of the cold solenoid 124 and the hot solenoid 122 to open and close each of the solenoid valves. The cold 124 and hot 122 solenoids may be directly and physically connected with each of the respective cold and hot solenoid valves (best seen in FIG. 5) which physically control the flow of fluid in each respective cold 114 and hot 112 conduits.

In one embodiment of the inventive concepts disclosed herein, the manifold microcontroller 180 may be configured for additional function via external communication. In one example, the host aircraft data system may communicate with the manifold microcontroller 180

In another example, an external data port sited on the manifold microcontroller 180 may allow a maintenance function or to load additional or updated commands to the manifold microcontroller 180.

In embodiments, the touchless manifold system 110 may function to manipulate each of the cold and hot solenoids 122/124 to operate the solenoid valves in a fully open position, and a fully closed position. In this manner, the touchless manifold system 110 may function to accurately regulate the temperature at the faucet thermal sensor 156 and therefore, regulate the temperature at the faucet 140 outlet.

In one embodiment of the inventive concepts disclosed herein, each of the faucet valve sensor 146, the faucet cold selection sensor 144, and the faucet hot selection sensor 142 may be able to sense a hand motion of a user. In this manner, the user may control the temperature as well as the flow of water at the faucet 140.

In one embodiment of the inventive concepts disclosed herein, the timing command may include an open command as well as a close command causing a ratio of opening time between the cold solenoid valve and the hot solenoid valve. In addition, the commands from the manifold microcontroller 180 may include a command signal from the manifold microcontroller 180 to each of the hot solenoid 122 and the cold solenoid 124.

In embodiments, the manifold microcontroller 180 may command a mix of the cold flow with the hot flow via alternating operation of the hot and cold solenoids 122 124. In this manner, the touchless manifold system 110 may consume lesser electrical load from the host aircraft. Alternatively, simultaneous valve actuation the hot 122 and cold 124 solenoids as commanded by the touchless manifold system 110 allowing an accurate temperature management capability.

As an alternative, instead of being physically proximal with the faucet 140, the mixed thermal sensor 156 may be proximal with the mixing chamber 186. In this manner, the mixed thermal sensor 156 may accurately measure the output of the mixing chamber 186 regardless of a length of a water connection between the touchless manifold system 110 and the faucet 140.

FIG. 2

Figure 2:
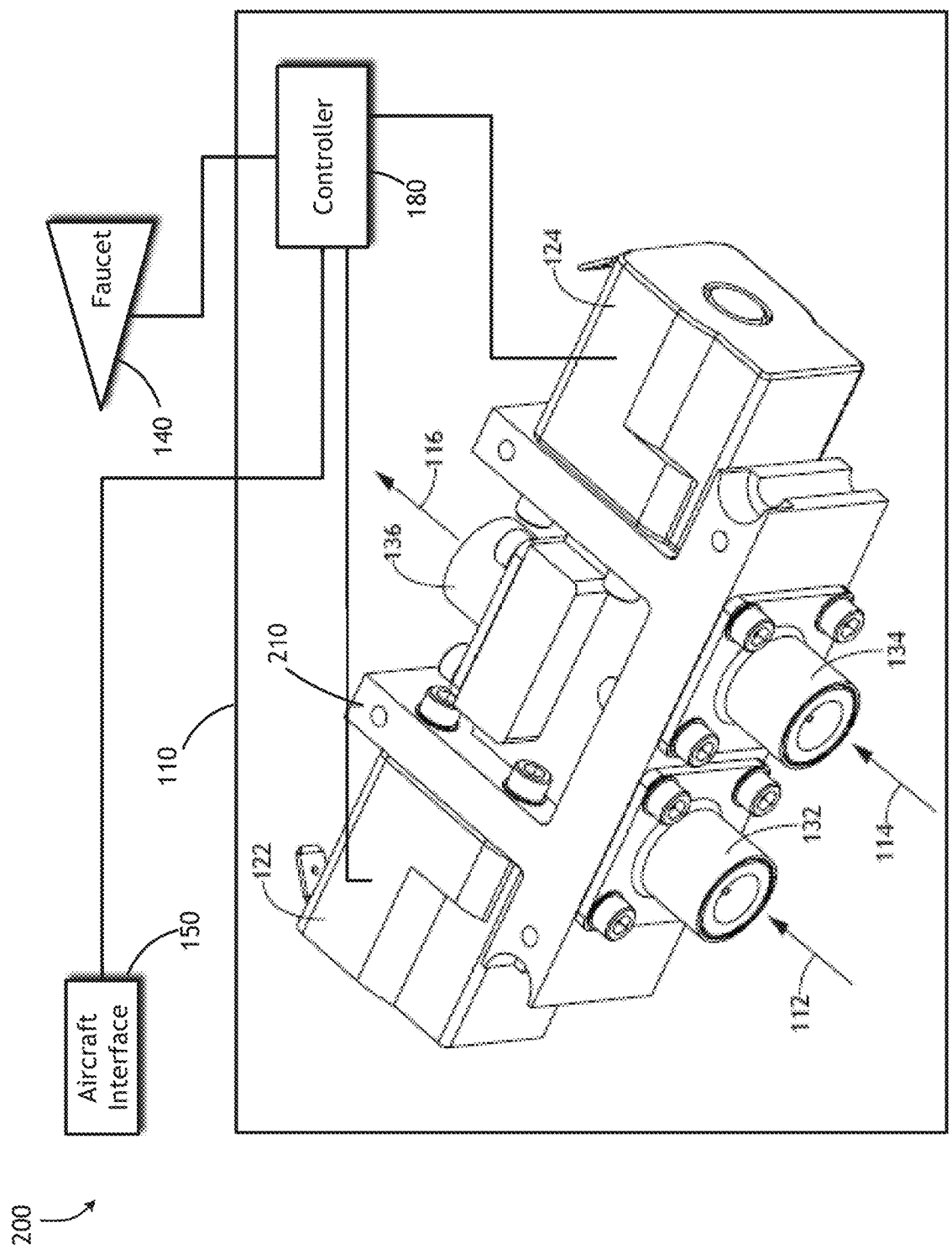
FIG. 2 is a diagram of a touchless manifold system in accordance with an embodiment of the inventive concepts disclosed herein.

Referring now to FIG. 2, a diagram of a touchless manifold system in accordance with an embodiment of the inventive concepts disclosed herein is shown. An orthogonal view 200 of the touchless manifold system 110 may indicate the various elements. Here, the touchless manifold system 110 may include a manifold body 210, the hot inlet 132, the cold inlet 134, the mixed outlet 136 and each of the hot and cold solenoids 122 124. The manifold microcontroller 180 may be shown operatively coupled with each of the aircraft interface 150, both solenoids 122 124, and the touchless faucet 140.

FIG. 3

Figure 3:
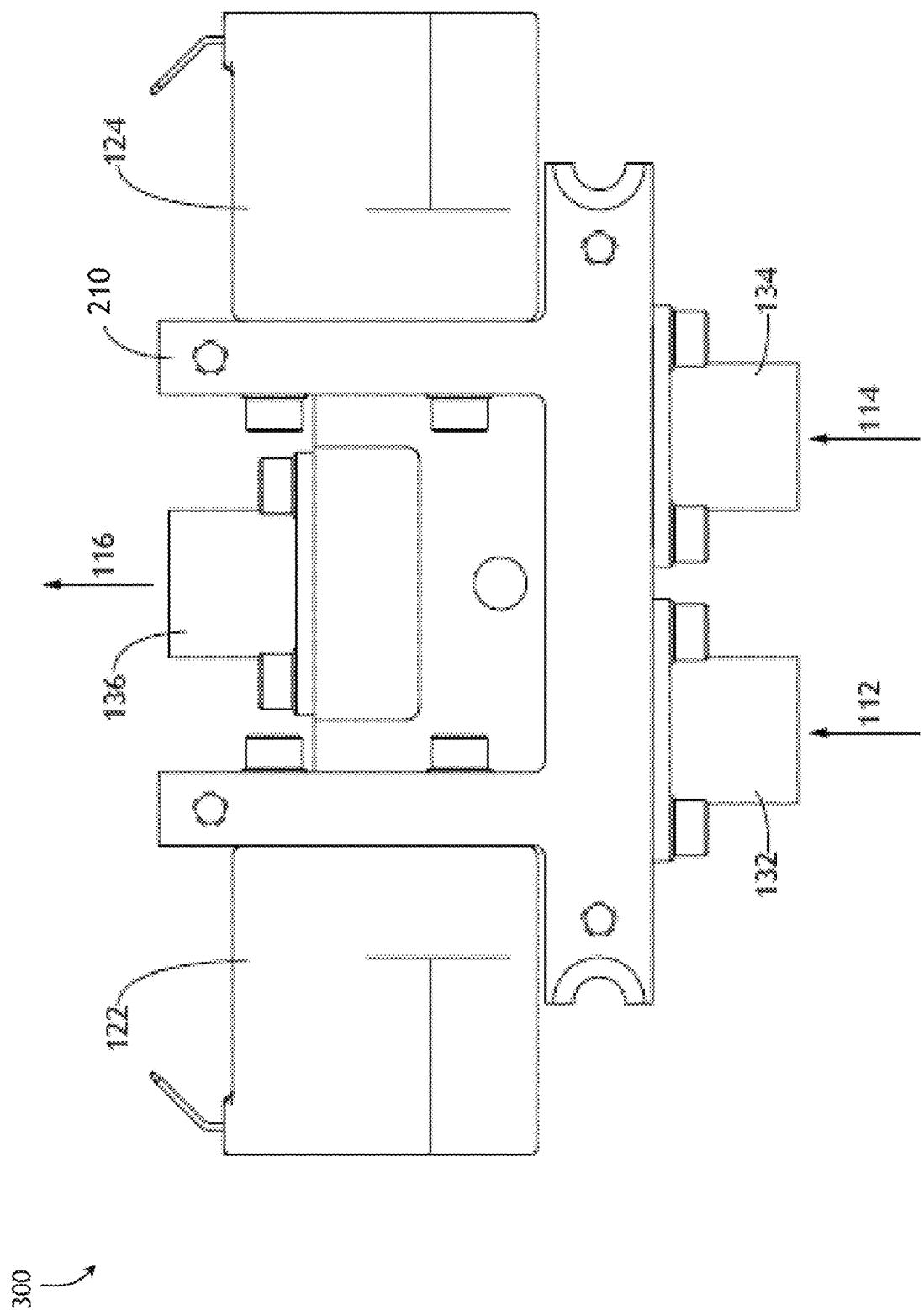
FIG. 3 is a diagram of a touchless manifold system in accordance with an embodiment of the inventive concepts disclosed herein.

Referring now to FIG. 3, a diagram of a touchless manifold system in accordance with an embodiment of the inventive concepts disclosed herein is shown. A front view 300 may indicate placement of each of the elements of the touchless manifold system 110.

FIG. 4

Figure 4:
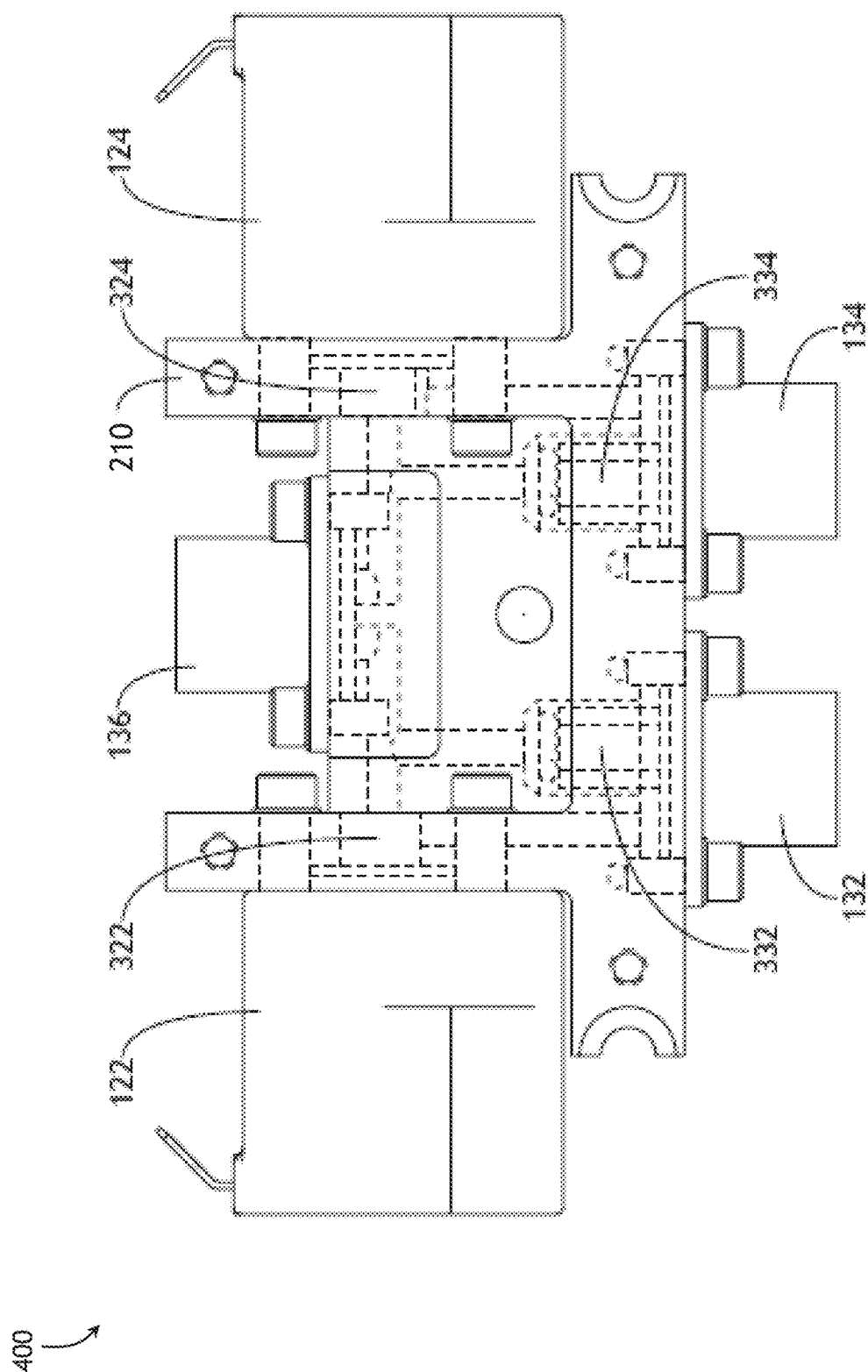
FIG. 4 is a diagram of a touchless manifold system exemplary of an embodiment of the inventive concepts disclosed herein.

Referring now to FIG. 4, a diagram of a touchless manifold system exemplary of an embodiment of the inventive concepts disclosed herein is shown. A transparent view 400 of the manifold body 210 may indicate internal routing of each element. Here the hot solenoid valve 322 and the cold solenoid valve 324 may be shown proximal with each respective solenoid 122 124.

FIG. 5

Figure 5:
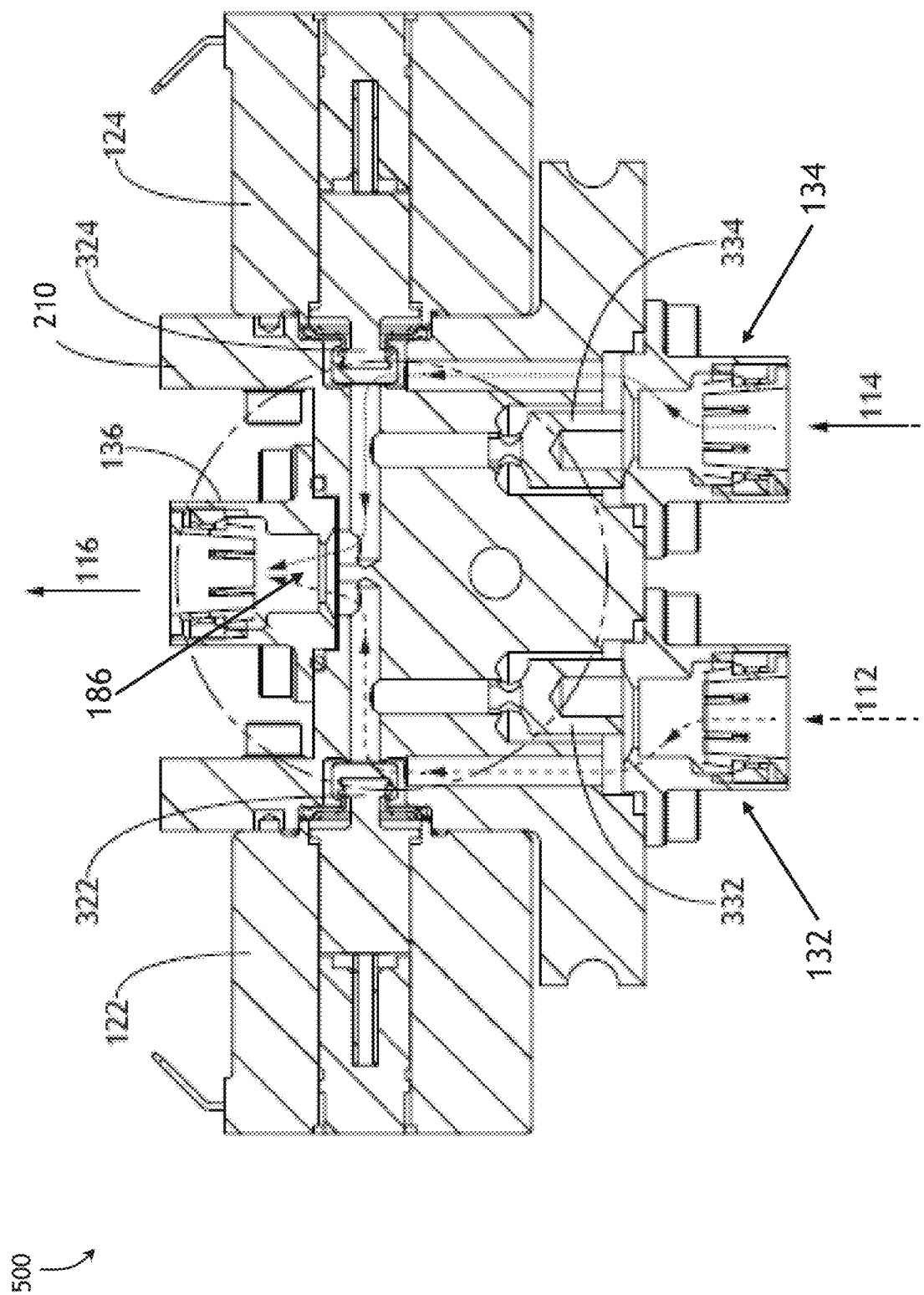
FIG. 5 is a cut away diagram of a touchless manifold system exemplary of one embodiment of the inventive concepts disclosed herein.

Referring now to FIG. 5, a cut away diagram of a touchless manifold system exemplary of one embodiment of the inventive concepts disclosed herein is shown. A cut away view 500 of the touchless manifold system 110 may indicate various routing of each conduit. Here the hot conduit 112 may be seen as a dashed line routing through the hot inlet 132, proximal with the hot solenoid valve 322 and into the mixing chamber 186. Similarly, the cold conduit may be indicated by a dotted line routing through the cold inlet 134, proximal with the cold solenoid valve 324, and into the mixing chamber 186. Of note, and lending to the durability of the design, no moving parts or external input is required nor desired to affect mixing of the two flows of fluid within the mixing chamber 186. Here, the simple timing of the opening and closing of each solenoid valve 322 324 as controlled by the manifold microcontroller 180 may create the desired mix of fluid to realize the desired temperature. There is no negative pressure created nor are there external ports to allow an airflow into the mixing chamber 186.

In one embodiment of the inventive concepts disclosed herein, the mixing chamber 186 is sited proximal with (downstream of) each of the cold solenoid valve 324, the hot solenoid valve 322, and the mixed conduit 116, the mixing chamber 186 may be configured to receive an output from each of the cold and hot solenoid valves 322 324 and deliver a mixed flow to the mixed conduit 116.

Each of the hot and cold sides may also include poppet valves including a cold poppet 334 and a hot poppet 332. Each poppet valve may function to 1) drain each respective conduit once a pressure is released from each conduit and 2) to vent internal pressure as pressure may be applied to each conduit 112 114. For example, during cold storage, an operator may desire a complete drain of an aircraft water system by relieving the pressure within the system. Here, the poppet valves 332 334 may allow for the touchless manifold system 110 to be adequately drained as well.

FIG. 6

Figure 6:
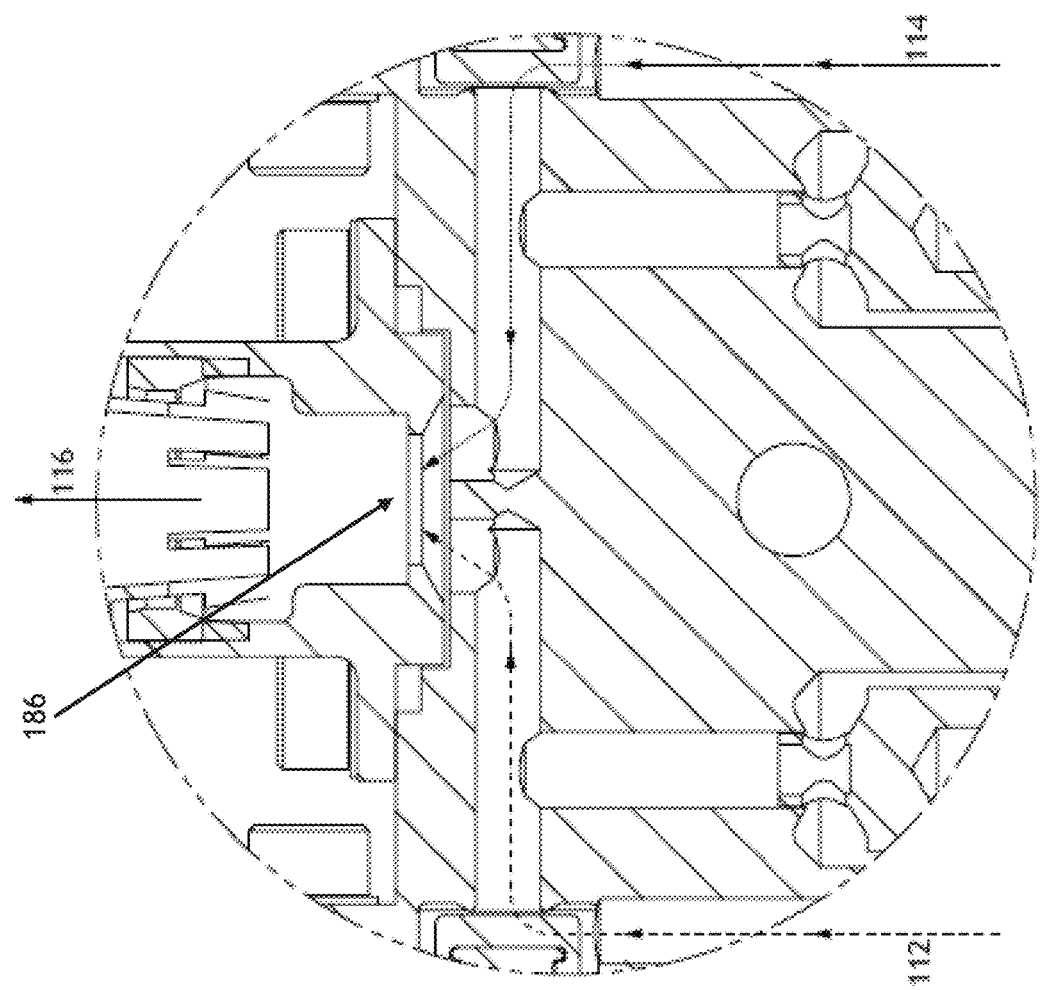
FIG. 6 is a diagram expanded view of a mixing area of a touchless manifold system in accordance with one embodiment of the inventive concepts disclosed herein.

Referring now to FIG. 6, a diagram expanded view of a mixing area of a touchless manifold system in accordance with one embodiment of the inventive concepts disclosed herein is shown. A cut away expanded view 600 of the manifold body 210 may detail each conduit flowing through the manifold body 210. As above, the hot conduit 112 and the cold conduit 114 may meet at the mixing chamber 186.

FIG. 7

Figure 7C:
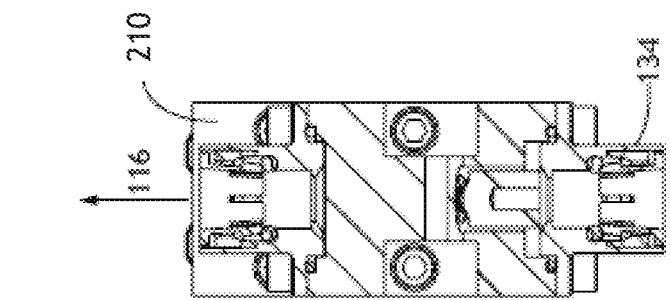
FIGS. 7A-7C are diagrams of an exemplary touchless manifold system in accordance with one embodiment of the inventive concepts disclosed herein.
Figure 7A:
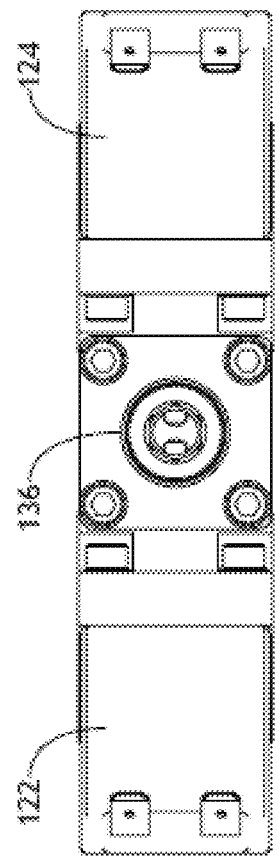
Figure 7B:
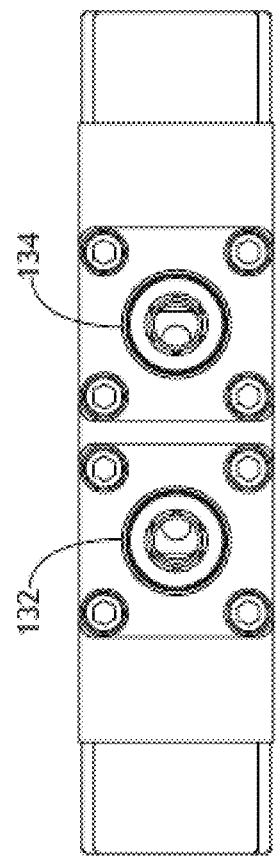

Referring now to FIGS. 7A-7C, diagrams of an exemplary touchless manifold system in accordance with one embodiment of the inventive concepts disclosed herein are shown. Top, bottom, and side views 700 may indicate each feature of the touchless manifold system 110.

FIG. 8

Figure 8B:
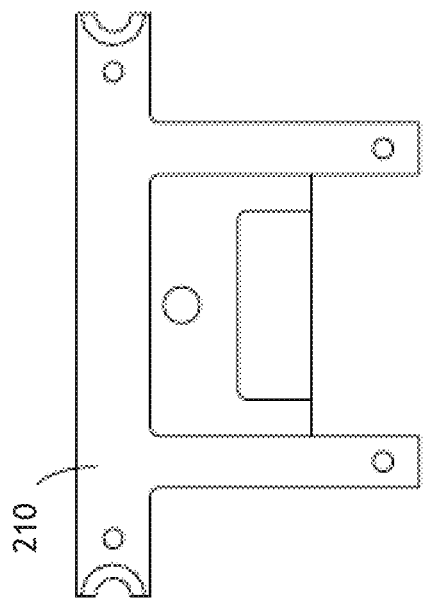
FIGS. 8A-8C are diagrams of a touchless manifold system body associated with one embodiment of the inventive concepts disclosed herein.
Figure 8C:
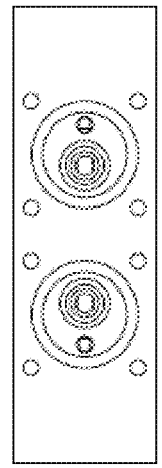
Figure 8A:
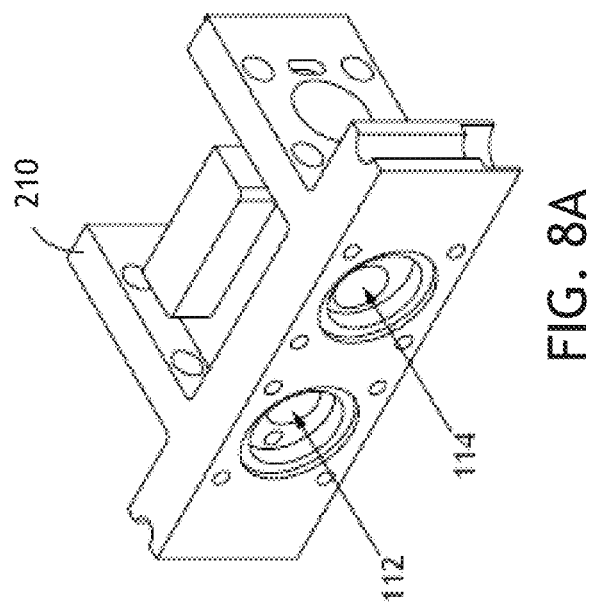

Referring now to FIGS. 8A-8C, diagrams of a touchless manifold system body associated with one embodiment of the inventive concepts disclosed herein are shown. Views 800 of the manifold body 210 without external elements may indicate structure configured for use. It is contemplated herein, the manifold body 210 may be a single piece of material constructed of a durable substance resistant to corrosion and wear. Also, multiple parts may be constructed and fitted together to create the manifold body 210.

FIG. 9

Figure 9:
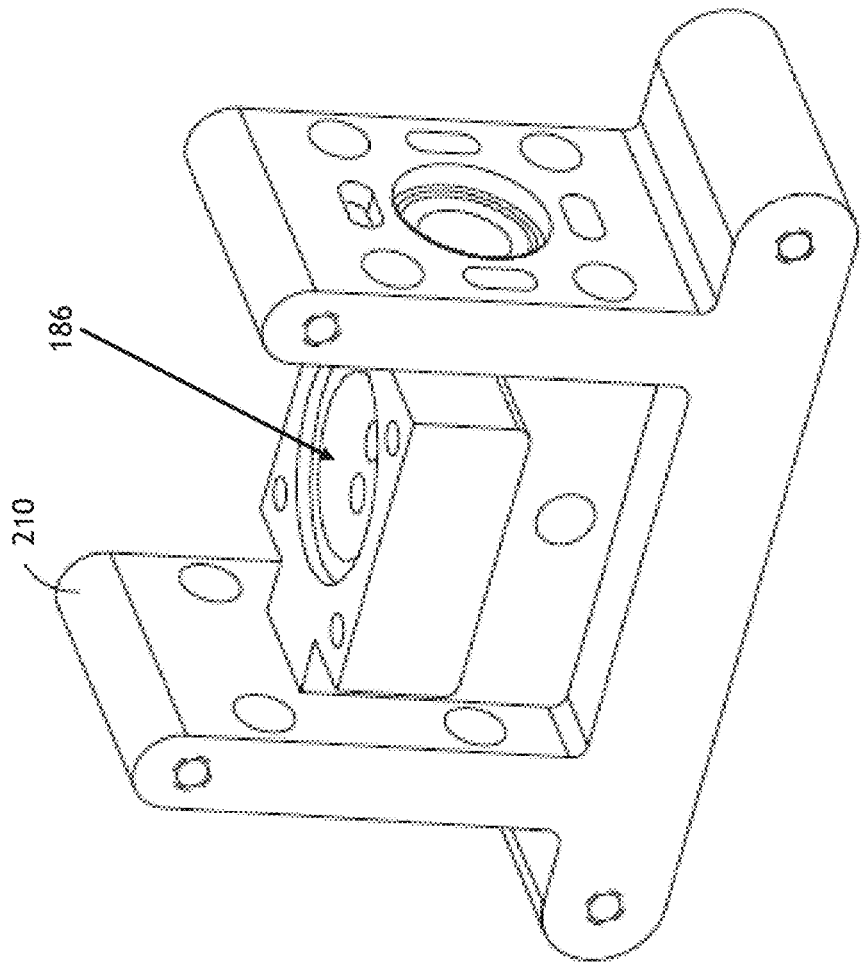
FIG. 9 is a diagram of a touchless manifold system body expanded exemplary of one embodiment of the inventive concepts disclosed herein.

Referring now to FIG. 9, a diagram of a touchless manifold system body expanded exemplary of one embodiment of the inventive concepts disclosed herein is shown. An expanded view 900 of the manifold body 210 may indicate detail including the mixing chamber 186.

FIG. 10

Figure 10:
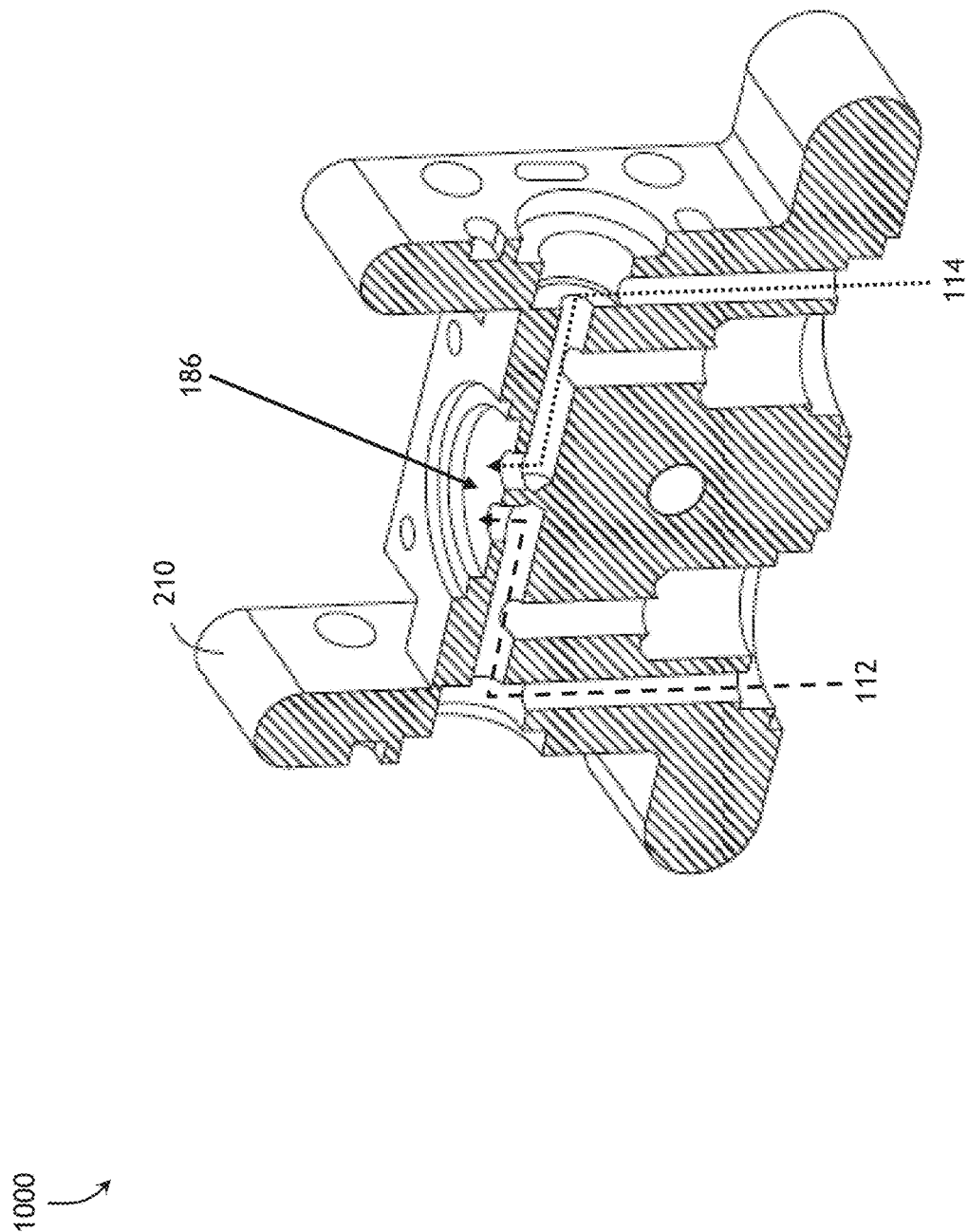
FIG. 10 is a diagram of a touchless manifold system body cutaway exemplary of one embodiment of the inventive concepts disclosed herein.

Referring now to FIG. 10, a diagram of a touchless manifold system body cutaway exemplary of one embodiment of the inventive concepts disclosed herein is shown. An expanded cut away view 1000 of the manifold body 210 may indicate an ability for a single piece construction. The hot conduit 112 and the cold conduit 114 may be seen routing through the manifold body 210.

FIG. 11

Figure 11:
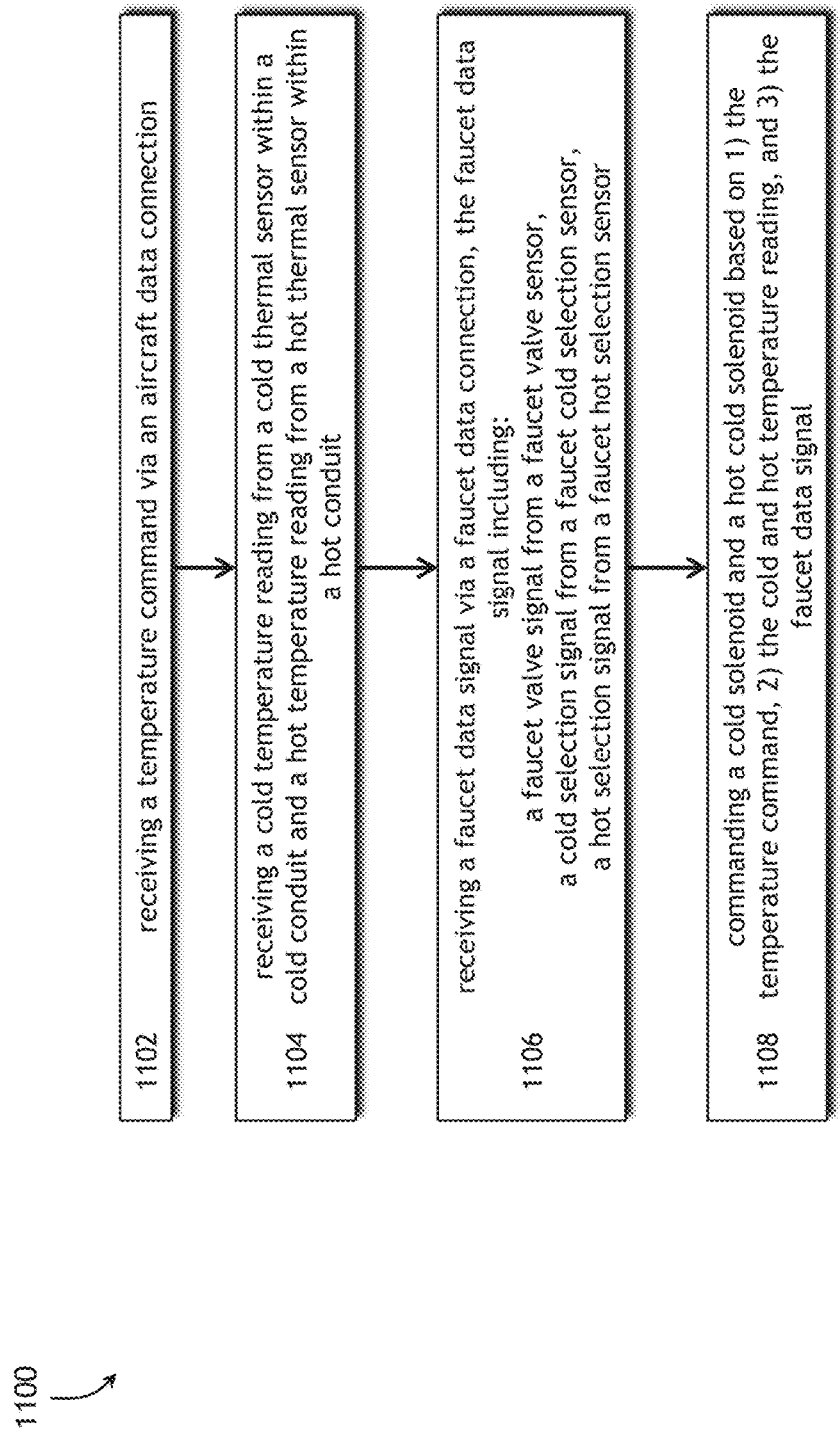
FIG. 11 is a flow diagram for a method for touchless manifold control exemplary of one embodiment of the inventive concepts disclosed herein.

Referring now to FIG. 11, a flowchart 1100 of a method for lavatory touchless control is shown. A step 1102 may include receiving a temperature command via an aircraft data connection. A step 1104 may include receiving a cold temperature reading from a cold thermal sensor within a cold conduit and a hot temperature reading from a hot thermal sensor within a hot conduit. A step 1106 may include receiving a faucet data signal via a faucet data connection, the faucet data signal including a mixed temperature reading from a mixed thermal sensor, a faucet valve signal from a faucet valve sensor, a cold selection signal from a faucet cold selection sensor, and a hot selection signal from a faucet hot selection sensor. A step 1108 may include commanding a cold solenoid and a hot cold solenoid based on 1) the temperature command, 2) the cold and hot temperature reading, and 3) the faucet data signal.

FIG. 12

Figure 12A:
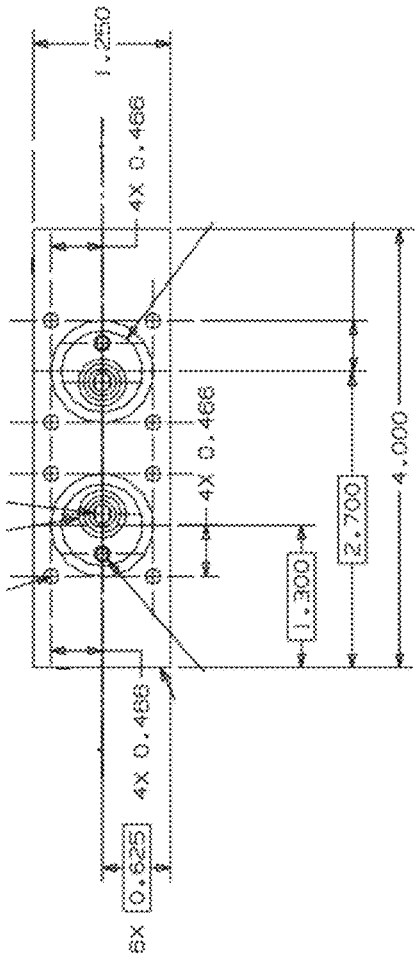
FIG. 12A-12B are diagrams of exemplary dimensions for touchless manifold body exemplary of one embodiment of the inventive concepts disclosed herein.
Figure 12B:
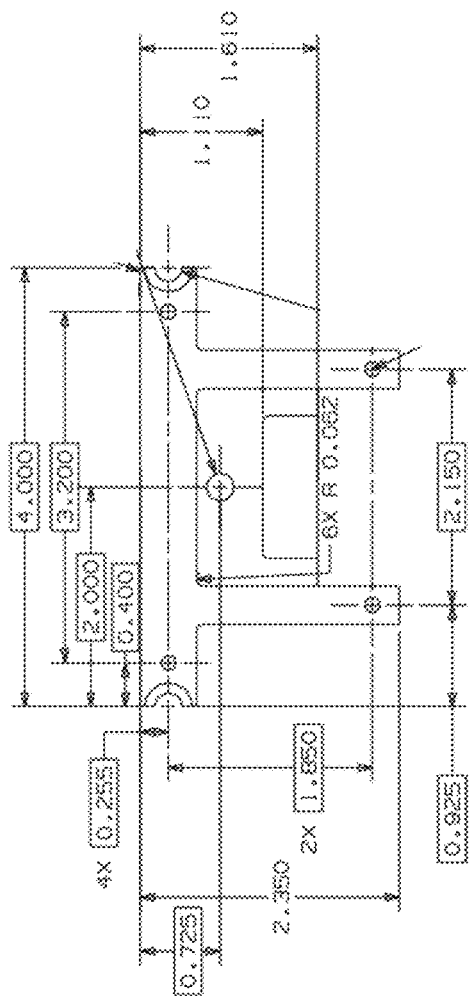

Referring now to FIGS. 12A-12B, diagrams 1200 of exemplary dimensions of a manifold body 210 are shown.

CONCLUSION

As will be appreciated from the above description, embodiments of the inventive concepts disclosed herein may provide a system and related method for a touchless manifold system configured to operate when installed on a plurality of aircraft types and models. The touchless manifold system may be particularly configured for continued operation combining efficient control methods with durable solenoid operated valves.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for aircraft lavatory touchless water control, comprising:
    a touchless manifold system having a cold conduit, a hot conduit, a mixing chamber, and a mixed conduit, the touchless manifold system including
    a cold inlet coupled with the cold conduit and configured to couple with an aircraft cold water supply;
    a hot inlet coupled with the hot conduit and configured to couple with an aircraft hot water supply
    an aircraft data connection;
    a faucet data connection;
    a manifold microcontroller operatively coupled with the aircraft data connection and the faucet data connection;
    a cold thermal sensor proximal with the cold inlet and configured to measure a temperature of a cold fluid within the cold conduit, the cold thermal sensor operatively coupled with the manifold microcontroller;
    a hot thermal sensor proximal with the hot inlet and configured to measure a temperature of a hot fluid within the hot conduit, the hot thermal sensor operatively coupled with the manifold microcontroller;
    a cold solenoid operatively coupled with the manifold microcontroller and a cold solenoid valve, the cold solenoid valve configured to control a flow of the cold fluid within the cold conduit;
    a hot solenoid operatively coupled with the manifold microcontroller and a hot solenoid valve, the hot solenoid valve configured to control a flow of the hot fluid within the hot conduit;
    the mixing chamber proximal with each of the cold solenoid valve, the hot solenoid valve, and the mixed conduit, the mixing chamber configured to receive an output from each of the cold and hot solenoid valves and deliver a mixed flow to the mixed conduit;
    the microcontroller configured for:
        receiving a temperature command via the aircraft data connection;
        receiving a cold temperature reading from the cold thermal sensor and a hot temperature reading from the hot thermal sensor;
        receiving a faucet data signal via the faucet data connection, the faucet data signal including
            a faucet valve signal from a faucet valve sensor;
            a cold selection signal from a faucet cold selection sensor;
            a hot selection signal from a faucet hot selection sensor;

mixing the cold flow with the hot flow via a timing command of the cold solenoid and the hot solenoid based on 1) the temperature command, 2) the cold and hot temperature reading, and 3) the faucet data signal.

2. The system for aircraft lavatory touchless water control of claim 1, wherein the aircraft data connection and the faucet data connection are configured for data connectivity with a Controller Area Network (CAN) data bus.

3. The system for aircraft lavatory touchless water control of claim 2, wherein the faucet data signal further includes a mixed temperature reading from a mixed thermal sensor, and wherein the manifold microcontroller is configured to receive the faucet data signal from a faucet manifold microcontroller via the CAN data bus.

4. The system for aircraft lavatory touchless water control of claim 1, wherein the cold fluid and the hot fluid are potable water.

5. The system for aircraft lavatory touchless water control of claim 1, wherein the timing command is an open command and close command causing a ratio of opening time between the cold solenoid valve and the hot solenoid valve.

6. The system for aircraft lavatory touchless water control of claim 1, wherein commanding the hot solenoid and the cold solenoid further comprises a command signal from the manifold microcontroller to each of the hot solenoid and the cold solenoid.

7. The system for aircraft lavatory touchless water control of claim 1, wherein the cold and hot solenoids are further configured for one of: a fully open position and a fully closed position.

8. The system for aircraft lavatory touchless water control of claim 3, wherein the temperature command received via the aircraft data connection further comprises a maximum, a minimum, and range temperature at one of:
the cold thermal sensor, the hot thermal sensor, and the mixed thermal sensor.

9. The system for aircraft lavatory touchless water control of claim 1, wherein each of the manifold microcontroller and cold and hot solenoids operate on a 28 Vdc power supply.

10. The system for aircraft lavatory touchless water control of claim 1, wherein the faucet valve sensor, the faucet cold selection sensor, and the faucet hot selection sensor are motion sensors.

11. The system for aircraft lavatory touchless water control of claim 3, wherein the mixed thermal sensor is proximal with the mixing chamber.

12. A method for aircraft lavatory touchless water control, comprising:
receiving a temperature command via an aircraft data connection;
receiving a cold temperature reading from a cold thermal sensor within a cold conduit and a hot temperature reading from a hot thermal sensor within a hot conduit;
receiving a faucet data signal via a faucet data connection, the faucet data signal including:
a faucet valve signal from a faucet valve sensor;
a cold selection signal from a faucet cold selection sensor;
a hot selection signal from a faucet hot selection sensor;
commanding a cold solenoid and a hot solenoid based on 1) the temperature command, 2) the cold and hot temperature reading, and 3) the faucet data signal;
wherein the cold solenoid is operatively coupled with a cold solenoid valve, the cold solenoid valve configured to control a flow of a cold fluid within the cold conduit;
the hot solenoid is operatively coupled with a hot solenoid valve, the hot solenoid valve configured to control a flow of a hot fluid within the hot conduit;
each of the cold and hot solenoid valves is proximal with a mixing chamber configured to receive an output from each of the cold and hot solenoid valves and deliver a mixed flow to a mixed conduit.

13. The method for aircraft lavatory touchless water control of claim 12, wherein receiving via the aircraft data connection and the faucet data connection further comprises receiving signals configured for data connectivity via a Controller Area Network (CAN) data bus.

14. The method for aircraft lavatory touchless water control of claim 12, wherein the faucet valve signal is an on off signal.

15. The method for aircraft lavatory touchless water control of claim 12, wherein the cold fluid and the hot fluid are both potable water.

16. The method for aircraft lavatory touchless water control of claim 12, wherein commanding the hot solenoid and the cold solenoid further comprises a command signal to each of the hot solenoid and the cold solenoid, the cold and hot solenoids are further configured for one of: a fully open position and a fully closed position.

17. The method for aircraft lavatory touchless water control of claim 12, wherein commanding the cold solenoid and the hot solenoid is further based on a mixed temperature reading received from a mixed thermal sensor.

18. The method for aircraft lavatory touchless water control of claim 17, wherein receiving the temperature command via the aircraft data connection further comprises receiving a maximum, a minimum, and range temperature measured at one of: the cold thermal sensor, the hot thermal sensor, and the mixed thermal sensor.

19. The method for aircraft lavatory touchless water control of claim 12, wherein the faucet valve sensor, the faucet cold selection sensor, and the faucet hot selection sensor are motion sensors.

20. The method for aircraft lavatory touchless water control of claim 17, wherein the mixed thermal sensor is proximal with the mixing chamber.

\* \* \* \* \*